United States Patent [19]
Drifka et al.

[11] Patent Number: 5,842,497
[45] Date of Patent: Dec. 1, 1998

[54] ADJUSTABLE SHEAR DIRECT CONTACT STEAM INJECTION HEATER

[75] Inventors: Brian N. Drifka, Pewaukee; Bruce A. Cincotta, Wauwatosa, both of Wis.

[73] Assignee: Hydro-Thermal Corporation, Waukesha, Wis.

[21] Appl. No.: 650,648

[22] Filed: May 20, 1996

[51] Int. Cl.⁶ .................................................. G05D 11/16
[52] U.S. Cl. ........................... 137/92; 137/100; 137/334; 137/891; 251/121; 251/214; 251/229
[58] Field of Search .............................. 137/92, 100, 334, 137/891, 892, 893, 895; 251/121, 229, 266, 267, 344

[56] References Cited

U.S. PATENT DOCUMENTS

| | | | |
|---|---|---|---|
| 2,692,564 | 10/1954 | Miller | 137/891 X |
| 2,794,447 | 6/1957 | Spitz | 137/891 X |
| 3,338,173 | 8/1967 | Gunzel et al. | 137/891 X |
| 3,799,195 | 3/1974 | Hermans | 137/891 X |
| 4,037,618 | 7/1977 | Kresser et al. | 137/891 X |

OTHER PUBLICATIONS

Hydro–Thermal Corporation Series "B" Hdyroheater, HB–D–1A, admitted prior art.
Hydro–Thermal K412 Series, admitted prior art.
Hdyro–Thermal Corporation Actuator Mounted Series "J" Hydroheater, HJ–D–5, admitted prior art.

Primary Examiner—Stephen M. Hepperle
Attorney, Agent, or Firm—Andrus, Sceales, Starke & Sawall

[57] ABSTRACT

A direct contact steam injection heater allows shear to be adjusted without taking the process off-line to relieve pressure within the heater. A stud is mounted to an adjustable combining tube within the heater. The stud extends through an opening in the heater body into a sealed housing. An adjusting mechanism exerts force on the combining tube stud within the sealed housing to move the combining tube longitudinally within the body to adjust the shear within the heater. The position of the combining tube is indicated by an analog revolution counter. The adjusting mechanism can be driven manually or by a motor. The motorized embodiment of the invention can be used with feedback control to automatically optimize shear.

24 Claims, 3 Drawing Sheets

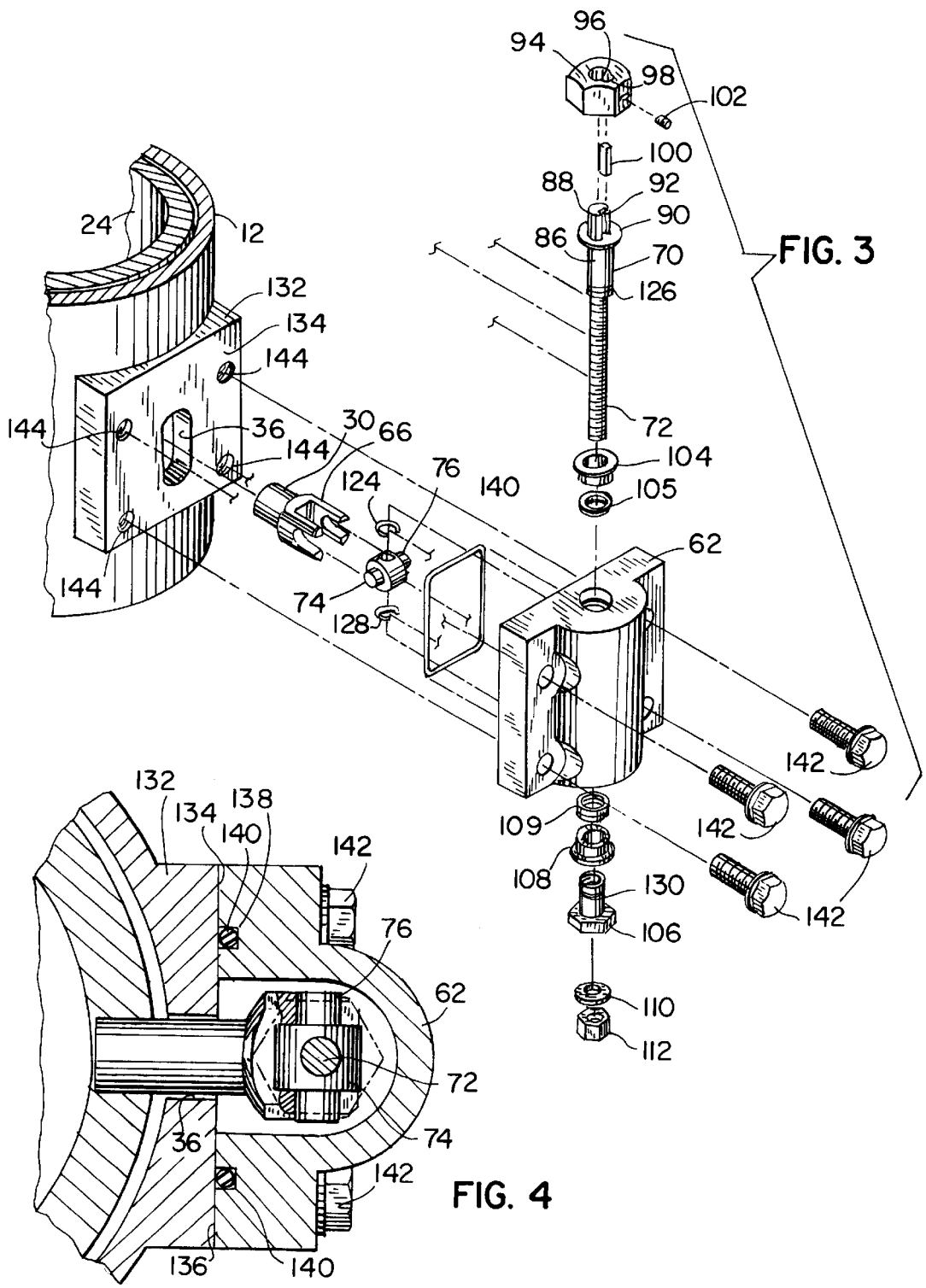

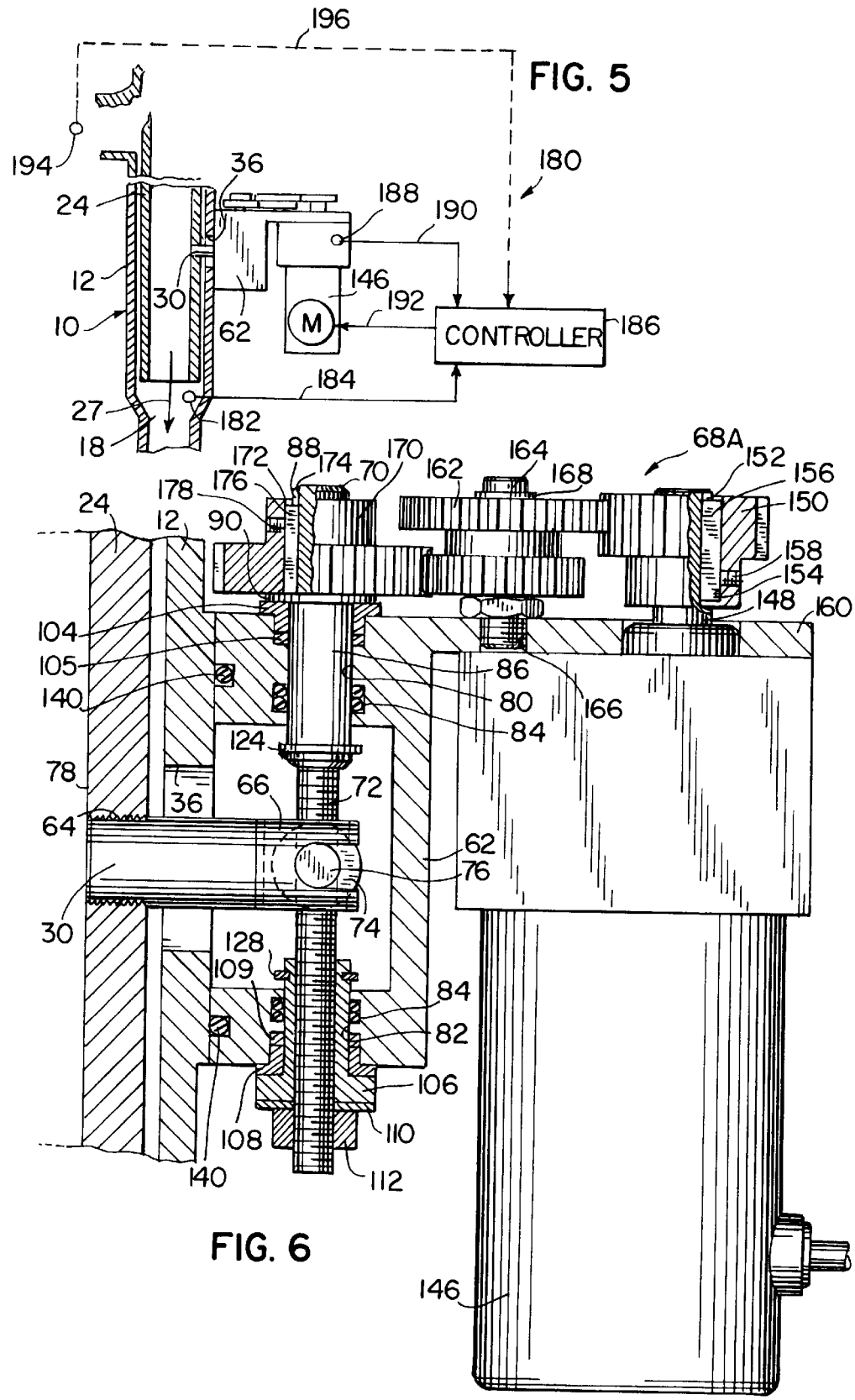

ADJUSTABLE SHEAR DIRECT CONTACT STEAM INJECTION HEATER

FIELD OF THE INVENTION

The invention relates to direct contact steam injection heaters providing adjustable shear for a liquid or slurry product flowing through the heater. In particular, the invention relates to a heater in which shear can be adjusted without taking the process off-line to relieve pressure within the heater.

BACKGROUND OF THE INVENTION

In direct contact steam injection heaters, steam is directly mixed with a liquid or slurry product to heat the product. Direct contact steam injection heaters are very effective at transferring heat energy from steam to liquid or slurry products. The heaters provide rapid heat transfer with virtually no heat loss to the atmosphere, and also transfer both the latent and available sensible heat of the steam to the product.

One type of commercially available direct contact steam injection heater provided by the assignee of the present invention, has an adjustable combining tube that restricts product flow into the heater and adjusts shear on the product flowing through the heater. This prior art direct contact steam injection heater has a heater body having a steam inlet, a product inlet, and an outlet for the heated product. A steam nozzle is located within the body downstream of the steam inlet. A longitudinal combining tube is slidably mounted in the heater body between the steam nozzle and the heater outlet. The combining tube has an upstream end that is spaced away from the steam nozzle a variable distance to form a passage from the product inlet into the combining tube. The position of the combining tube is maintained by a combining tube stud that is mounted to the combining tube. It can be important, particularly for cooking starch, to adjust the combining tube up or down so that the product has proper velocity and thickness when the steam from the nozzle impinges the product. In many applications, there is an optimum setting for the distance between the steam nozzle and the upstream end of the combining tube. The optimum setting often varies depending on flow rates, temperatures and composition of the product.

With the above-described prior art direct contact steam injection heaters, it is necessary to take the system off-line to relieve pressure within the heater before adjusting the position of the combining tube. However, it is not usually desirable to shut down an entire process to make shear adjustments. Therefore, some producers forego optimizing product shear. In fact, many producers use a substantial amount of enzymes to promote proper product quality even under substandard product shear conditions.

SUMMARY OF THE INVENTION

The invention is a direct contact steam injection heater in which the position of the combining tube, and thus shear on the liquid or slurry product can be adjusted while the heater is pressurized and on-line. With the invention, shear can be adjusted either manually, by a manually operated motor, or automatically in response to feedback signals. The invention promotes operation of the heater with the combining tube in an optimum position, thus improving cooking effectiveness, reducing enzyme use, and improving product quality.

In one aspect, the invention is a direct contact steam injection heater having a body that has a steam inlet, a product inlet and an outlet for the heated liquid or slurry product. A steam nozzle is located within the body downstream of the steam inlet. A longitudinal combining tube is slidably mounted in the body between the steam nozzle and the outlet. The combining tube has an upstream end that is spaced away from the steam nozzle at a variable distance to form a passage from the product inlet into the combining tube. Heated product exits the combining tube, and exits through the product outlet of the heater body. As in the prior art, the position of the combining tube is maintained by a combining tube stud that is mounted to the combining tube. The combining tube stud extends through a stud opening in the heater body. However, in contrast to the prior art, the stud opening in the body is covered by a sealed housing, which allows the position of the combining tube to be adjusted while the system is on-line and the product within the heater is pressurized. In accordance with the invention, the combining tube stud extends from the combining tube, through the stud opening in the body, into the sealed housing. An adjusting mechanism exerts force on the combining tube stud within the sealed housing to move the combining tube longitudinally within the body and adjust the variable distance between the steam nozzle and the upstream end of the combining tube.

The preferred adjusting mechanism includes a drive shaft having threads that are located within the sealed housing. A follower engages the threads on the drive shaft and also engages the combining tube stud so that the follower moves the combining tube stud when the drive shaft rotates. Preferably, a portion of the drive shaft extends through the sealed housing, and the portion of the drive shaft external to the sealed housing is rotated manually or automatically. It is important that the sealed housing maintain a sufficient seal under the pressurized environment of the heater. The sealing arrangement shown in the drawings and described hereafter in the Detailed Description of the Drawings are sufficient for the purposes of the invention, however, other sealing arrangements may also be suitable. A manual version of the invention would typically include a wrench fitting on the portion of the drive shaft external to the sealed housing. A motorized version of the invention would typically include a motor, preferably an electric motor, along with accompanying gears to drive the drive shaft.

In another aspect, the invention is a direct contact steam injection heater in which shear on the product can be adjusted automatically in accordance with a feedback signal from a sensor measuring a quality of the product that flows through the heater. In this aspect of the invention, the heater includes a body having a steam inlet, a product inlet and an outlet through which the heated product flows. An adjustable shear mechanism is located within the body and imparts shear on the product flowing through the product inlet into the heater. A motor drives the adjustable shear mechanism. A sensor measures a quality of the product flowing through the outlet of the heater, such as pressure, viscosity, or dextrose equivalency, and generates a feedback signal in response thereto. The feedback signal is transmitted to a controller, and the controller outputs a correction signal. The motor receives the correction signal, and drives the adjustable shear mechanism in accordance with the correction signal.

In either the manual or the automatic versions of the invention, it is desirable to provide a combining tube position indicator so that the user can be aware of the combining tube position by externally viewing the heater. The preferred combining tube position indicator is a revolution counter that tallies the number of revolutions of the drive shaft of the adjusting mechanism.

BRIEF DESCRIPTION OF THE DRAWINGS

FIG. 3 is an assembly view of the mechanism shown in FIG. 2.

FIG. 4 is a view taken along line 4—4 in FIG. 2.

FIG. 5 is a schematic view of an automatic feedback control system for adjusting the shear in a direct contact steam injection heater in accordance with the invention.

FIG. 6 is a view showing a control scheme for an automatic version of the invention.

DETAILED DESCRIPTION OF THE DRAWINGS

Prior Art

Figure 1:
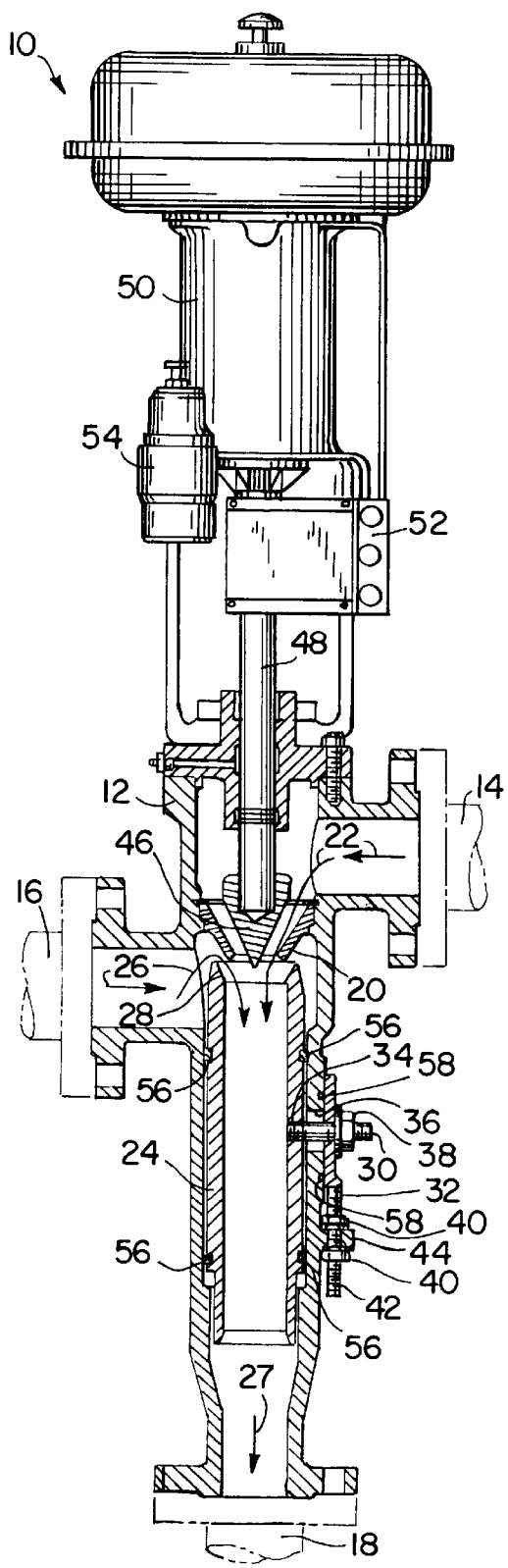
FIG. 1 is a side elevational view showing a longitudinal cross-section of a direct contact steam injection heater having an adjustable combining tube in accordance with the prior art.

FIG. 1 shows a direct contact steam injection heater 10 in accordance with the prior art. The heater has a body 12 having a steam inlet 14, a product inlet 16, and a heated product outlet 18. Steam flows into the heater 10 through the steam inlet 14 and through a steam nozzle 20 as depicted by arrows 22. A liquid or slurry product to be heated enters the heater 10 through the product inlet 16 and flows into a combining tube 24 as depicted by arrows 26. The heated product exits the heater body 10 through product outlet 18 as depicted by arrow 27.

The combining tube 24 is a longitudinal tube slidably mounted within the heater body 12. The steam nozzle 20 is a frustoconical nozzle that is located between the steam inlet 14 and an upstream end 28 of the combining tube 24. The steam nozzle 20 discharges steam coaxially into the combining tube 24. An air actuated plug 46 for the steam nozzle 20 is provided so that the amount of steam injected into the heater 10 can be modulated. The plug 46 has a stem 48 that is controlled by an air actuator 50 and a positioner 52. FIG. 1 also shows a filter/regulator 54.

The upstream end 28 of the combining tube 24 is spaced away from the steam nozzle 20 a variable distance to form a passage for product flowing from the product inlet 16 into the combining tube 24. The size of passage is adjusted by adjusting the longitudinal position of the combining tube 24 within the heater body 12.

During operation of the heater 10, the position of the combining tube 24 is maintained by a combining tube stud 30 that is locked into place by an adjustable sliding block 32. The combining tube stud 30 has an end 34 threaded into the combining tube 24. The combining tube stud 30 extends from the combining tube 24 through a combining tube stud opening 36 in the body 12 of the heater 10. The stud opening 36 provides space above and below the combining tube stud 30 so that the longitudinal position of the combining tube 24 can be adjusted. The combining tube stud 30 continues to extend and passes through an opening in the sliding block assembly 32. The combining tube stud 30 is attached to the sliding block assembly 32 using a nut 38. The sliding block assembly 32 is mounted to the heater body 12 by tightening a threaded shaft 42 on the sliding block assembly 32 to a flange 44 on the heater body 12 with nuts 40. The longitudinal position of the sliding block assembly 32, and thus the longitudinal position of the combining tube 24, is adjusted by loosening nut 38 and adjusting the position of nuts 40 on the threaded shaft 42 of the sliding block assembly 32. Nut 38 is re-tightened to secure the sliding block assembly 32 to the flange 44 on the heater body 12.

O-ring seals 56 between the combining tube 24 and the body 12 of the heater 10 provide a seal so that the product cannot migrate through the interface between the combining tube 24 and the body 12 towards the stud opening 36 in the body 12. In addition, seal 58 is provided at the interface between the heater body 12 and the sliding block assembly 32. Nuts 38 and 40 should not be loosened unless the heater is taken off-line and pressure within the heater 10 is relieved.

In some applications, it is preferred that the upstream end 28 of the combining tube 24 be located close to the steam nozzle 20 to provide a thin ribbon of product entering the combining tube 24 which facilitates sufficient shearing of the product as well as sufficient cookout. However, the optimum distance between the steam nozzle 20 and the upstream end 28 of the combining tube 24 depends not only on the product composition, but also on flow rates, pressures and temperatures. Therefore, it is often desirable to adjust the longitudinal position of the combining tube 24 within the body 12 while the process is on-line. The primary drawback with the prior art system shown in FIG. 1 is that the heater 10 should be taken off-line to relieve the pressure inside of the heater 10 before nuts 38 and 40 are loosened to adjust the position of the combining tube 24.

Present Invention

Figure 2:
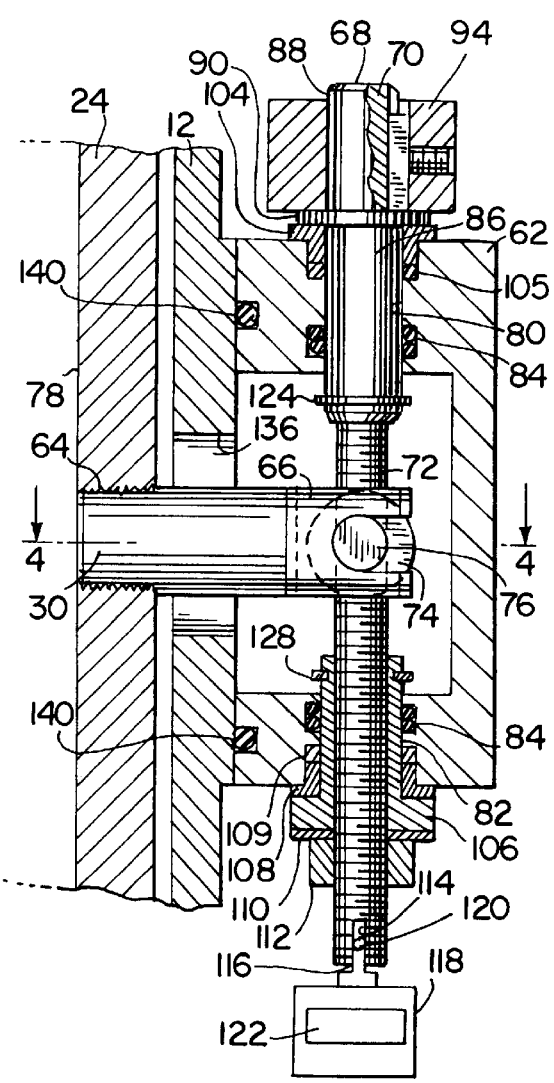
FIG. 2 is a detailed view of a sealed housing for a combining tube stud and an adjusting mechanism in accordance with the present invention.

A manual embodiment of the invention is illustrated in FIGS. 2–4. The embodiment of the invention shown in FIGS. 2–4 includes a sealed housing 62 that covers the stud opening 36 in the heater body 12 so that the combining tube stud 30 can be moved to adjust the position of the combining tube 24 without taking the heater 10 off-line to relieve the pressure. Similar reference numerals are used in FIGS. 2–4 as in FIG. 1 where appropriate to facilitate understanding.

The combining tube stud 30 is mounted to the combining tube 24 by screwing threads 64 on the combining tube stud 30 into a threaded opening in the combining tube 24. To improve sealing, the combining tube stud 30 should not screw entirely through to the inner surface 78 of the combining tube 24. It is preferred that the combining tube stud 30 stop short of the inner surface 78 of the combining tube 24 by about 1/32 of an inch.

The combining tube stud 30 extends from the outer surface of the combining tube 24 through the stud opening 36 in the heater body 12 into a cavity within the sealed housing 62. The range of adjustment for the combining tube 24 is defined by the range in which the combining tube stud 30 can travel within the stud opening 36 in the heater body 12.

An end of the combining tube stud 66 located within the sealed housing 62 has a clevis 66 that facilitates engagement of the combining tube stud 30 with an adjusting mechanism 68. The adjusting mechanism 68 exerts force on the clevis 66 within the sealed housing 62 to move the combining tube 24 longitudinally within the body 12 and adjust the variable distance between the steam nozzle 20 and the upstream end 28 of the combining tube 24. The adjusting mechanism 68 shown in FIGS. 2–4 includes a drive shaft 70 having threads 72. A follower 74 having internal threads engages the threads 72 on the drive shaft 70 and moves when the drive shaft 70 rotates. The follower 74 includes a pivot axle 76 that is perpendicular to the drive shaft 70. The pivot axle 76 engages the prongs of the clevis 66 on the combining tube stud 30 to move the stud 30 when the drive shaft 70 rotates.

It is preferable to use an axle 76 on the follower 74 and a clevis 66 on the combining tube stud 30 to reduce stresses on the combining tube stud 30 and the adjusting mechanism 68.

The diameter of the combining tube stud 30 is preferably about 1 inch to 1 and ⅛ inch. The combining tube stud 30 is preferably made of 17-4 stainless steel heat treated to 44 Rockwell C. While the invention is not limited to the specific dimensions and material for the combining tube stud 30, it should be recognized that if the length of the combining tube stud 30 is too large, there may be undue stresses on the stud 30 leading to premature malfunctions. In the preferred embodiment of the invention, the length of the combining tube stud 30 from the center pivot axis of the axle 76 on the follower 74 to the inside surface of the heater body 12 is 1⅛ inches.

The drive shaft 70 for the adjusting mechanism 68 extends through the sealed housing 62 through two openings, a first opening 80 and a second opening 82. Both the first opening 80 and the second opening 82 are sealed using a pair of O-rings 84.

The drive shaft 70 has a non-threaded sealing portion 86 that extends through the first opening 80 in the sealed housing 62. The drive shaft 70 also has an external portion 88 that extends longitudinally beyond the non-threaded sealing portion 86. A support shoulder 90 separates the non-threaded sealing portion 86 of the drive shaft 70 from the external portion 88 of the drive shaft 70. The external portion 88 has a longitudinal keyway 92. A wrench fitting 94 in the form of a threadless nut is mounted to the external portion 88 of the drive shaft 70. An internal opening 96 in the wrench fitting 94 includes a keyway 98. A key 100 is partially inserted into keyway 92 on the drive shaft 70 and into keyway 98 on the wrench fitting 94 to mount the wrench fitting 94 to the external portion 88 of the drive shaft 70. A set screw 102 secures the key 100. A user can rotate the drive shaft 70 by applying a wrench to the wrench fitting 94, thereby adjusting the position of the combining tube 24. A thrust bearing 104 and a needle roller bearing 105 are mounted within the first opening 80 to provide support for the shoulder 90 and the non-threaded sealing portion 86 of the drive shaft 70.

The threaded portion 72 of the drive shaft 70 extends through the second opening 82 in the sealed housing 62. A T-shaped end nut 106 having a threaded internal bore, screws onto the threads 72 of the drive shaft 70 from the outside of the sealed housing 62. A thrust bearing 108 and needle bearing 109 provide support for the T-shaped end nut 106 in the second opening 82 of the housing 62. To assemble the adjusting mechanism 68, the T-shaped end nut 106 is snugly tightened onto the threads 72 of the drive shaft 70, but not so tight to restrict rotation of the drive shaft 70 within the openings 80 and 82 of the housing 62. A thread sealing washer 110 (as known in the art) and a jam nut 112 are screwed onto the threads 72 of the drive shaft 70 to lock the T-shaped end nut 106 in place, and seal the threads 72 on the drive shaft 70.

As shown in FIG. 2, the lower end of the threaded portion 72 of the drive shaft 70 includes an internal hollow bore 114 that receives a shaft 116 from an analog revolution counter 118. A set screw 120 secures the counter shaft 116 within the drive shaft 70. The analog counter 118 preferably has a display 122 that indicates the number of drive shaft revolutions so that a user can determine the longitudinal position of the combining tube 24.

Snap ring 124 is snapped into groove 126 on the non-threaded portion 86 of the drive shaft 70 and snap ring 128 is snapped into groove 130 on the T-shaped end nut 106 after the drive shaft 70 has been installed in the sealed housing 62. The purpose of snap rings 124 and 128 is to prevent parts from dislodging from the sealed housing 62 in case the drive shaft 70 breaks.

Referring in particular to FIGS. 3 and 4, the heater body 12 has a mounting flange 132 surrounding the stud opening 36. The mounting flange 132 on the body 12 has a generally planar flange mounting surface 134. The sealed housing 62 is mounted to the mounting flange 132 on the heater body 12 by screwing bolts 142 through the housing 62 into threaded openings 144 on the mounting flange 132 of the heater body 12. The sealed housing 62 has a generally planar mounting face 136 that corresponds to the flange mounting surface 134 on the heater body 12. The planar mounting face 136 on the housing 62 has a seal groove 138. A rubber seal 140 resides in the seal groove 138. The seal 140 surrounds the stud opening 36 in the heater body 12 to seal the interface between the planar mounting face 136 on the housing 62 and the flange mounting surface 134 on the body 12.

FIGS. 5 and 6 relate to another version of the invention having an adjusting mechanism 68a that uses a motor 146 to rotate the drive shaft 70. In many respects, the invention shown in FIGS. 5 and 6 is similar to the invention shown in FIGS. 2–4 and similar reference numerals are used where appropriate to facilitate understanding. By comparing FIGS. 2 and 6, it should be apparent that one of the primary differences is that the system in FIG. 6 uses an electric motor 146 and gears to rotate drive shaft 70 rather than a wrench fitting 94 as shown in FIG. 2.

Referring in particular to FIG. 6, the motor 146 is preferably a 0.8 amp, 90 volt DC electric motor having a 1/20 horsepower output. The preferred motor has a torque of 345 inch-pounds and a 9 RPM output. The electric motor 146 is attached to a flange 160 extending from the housing 62. The motor 146 has an output shaft 148. A spur gear 150 is mounted to the electric motor output shaft 148. The output shaft 148 for the electric motor 146 has a keyway 152. The motor spur gear 150 also has a keyway 154. A key 156 is inserted into keyways 152 and 154 to mount the motor spur gear 150 to the output shaft 148. Set screw 158 secures the key 156.

The motor spur gear 150 drives an idler gear 162 that is mounted to the housing flange 160 in a direction towards the heater body 12 from the motor spur gear 150. The idler gear 162 spins freely about an axle 164. The axle 164 is secured into a threaded opening 166 in the housing flange 160. A snap ring 168 secures the idler gear 162 on the axle 164.

The idler gear 164 drives a spur gear 170 that is mounted to the external portion 88 of the drive shaft 70 for the adjusting mechanism 68a. The drive shaft spur gear 170 has a longitudinal keyway 172. The external portion 88 of the drive shaft 70 also has a longitudinal keyway 174. A key 176 is inserted into keyways 172 and 174 to mount the drive shaft spur gear 170 on the external portion 88 of the drive shaft 70. A set screw 178 secures the drive shaft spur gear 170 on the drive shaft 70.

Although it is not critical to the invention, it is desirable that the drive shaft spur gear 170 have a reasonably small diameter so that the length of the combining tube stud 30 need not be excessive. Using an idler gear 162 allows for the output of the electric motor 146 to be coupled to the drive shaft spur gear 170 without requiring the diameter of the drive shaft spur gear 170 to be excessive, and also allows for compact packaging of the electric motor 146.

FIG. 5 illustrates a feedback control system 180 for adjusting shear on a product flowing through the heater 10, which can be employed using the embodiment of the invention shown in FIG. 6. The system 180 in FIG. 5 includes a direct contact steam injection heater 10 that has an adjustable shear mechanism 24, 30 which can be adjusted without taking the heater 10 off-line to relieve pressure within the heater 10. While the preferred embodiment of the invention shown in FIG. 5 uses a heater as shown in FIG. 6, another type of heater with an on-line, adjustable shear mechanism may be used if available.

In FIG. 5, a sensor 182 measures a quality of the product flowing through the outlet 18 of the heater 10. The sensor 182 preferably measures pressure of the product exiting the heater 10, however, other types of sensors may be used in accordance with the invention. For instance, the sensor 182 may be used to measure dextrose equivalency or viscosity of the product exiting the heater 10. The sensor 182 generates a feedback signal that is transmitted through line 184 to an electronic controller 186. The electronic controller 186 preferably contains process-specific software for determining the optimum position for the combining tube 24 in response to the feedback signal from sensor 182 and/or possibly other information. An electronic revolution counter 188 provides a signal transmitted through line 190 to the controller 186 that indicates the position of the combining tube 24 within the heater 10. Based on the combining tube position signal, the feedback signal, and/or possibly other information, the controller 186 generates a correction signal that is transmitted through line 192 to the electric motor 146. The electric motor 146 drives the adjustable shear mechanism in accordance with the correction signal to obtain a position for the combining tube 24 that optimizes product shear through the heater 10.

In many processes, it may be desirable that the correction signal generated by the controller 186 also be dependent on a quality of the product measured upstream of the heater. In these applications, it may be desirable to provide an upstream sensor 194 that transmits a signal through line 196 (phantom) to controller 186. For example, it may be desirable that the correction signal depend on a pressure drop through the heater 10. In such an application, sensors 182 and 194 would both be pressure sensors.

Many processes using a direct contact steam injection heater react relatively slowly to adjustments in shear. Therefore, it is desirable that the rate at which the electric motor 146 drives the adjusting mechanism 68a be relatively slow, especially when the combining tube 24 is positioned substantially close to an optimum position. The electric motor 146 is typically a constant speed drive. However, if the electric motor 146 has a variable speed drive, it is desirable that the drive be operated relatively slow when the combining tube 24 is positioned substantially close to the optimum position. For instance, it is preferred that the combining tube 24 move at a rate no faster than about ½ of an inch per minute when the combining tube 24 is positioned at a location within 25% of the total combining tube 24 stroke from an optimum position for the combining tube 24.

In the system shown in FIGS. 5 and 6, it is especially important that the components of the adjusting mechanism 68 have sufficient strength to move the combining tube 24 under a wide range of operating conditions. It has been found that the combining tube 24 can occasionally become stuck within the heater due to blockage, etc. For this reason, the controller 186 should be programmed so that the controller 186 cannot generate a correction signal to drive the motor 146 beyond a maximum torque limit for the components of the adjusting mechanism 68a for the heater.

It is possible that various modifications may be made to the invention without departing from the spirit of the invention, and such modifications should be considered to be within the scope of the following claims.

I claim:

1. A direct contact steam injection heater comprising:
    a body having a steam inlet, a product inlet, a product outlet and a stud opening;
    a steam nozzle located within the body downstream of the steam inlet;
    a longitudinal combining tube slidably mounted in the body between the steam nozzle and the product outlet, the combining tube having an upstream end that is spaced away from the steam nozzle a variable distance to form a passage from the product inlet into the combining tube;
    a sealed housing covering the stud opening in the body;
    a combining tube stud mounted to the combining tube and extending through the stud opening in the body into the sealed housing; and
    an adjusting mechanism that exerts force on the combining tube stud within the sealed housing to move the combining tube longitudinally within the body and adjust the variable distance between the steam nozzle and the upstream end of the combining tube.

2. A direct contact steam injection heater as recited in claim 1 wherein the adjusting mechanism comprises:
    a drive shaft having threads;
    a follower engaging the threads on the drive shaft and engaging the combining tube stud so that the follower moves the combining tube stud when the drive shaft rotates; and
    means for rotating the drive shaft.

3. A direct contact steam injection heater as recited in claim 2 wherein:
    the follower has a pivot axle perpendicular to the drive shaft; and
    the end of the combining tube stud in the sealed housing has a clevis that engages the pivot axle of the follower.

4. A direct contact steam injection heater as recited in claim 3 wherein the length of the combining tube stud from a center pivoting axis of the clevis to an outside surface of the body of the heater is less than one and one-half inches.

5. A direct contact steam injection heater as recited in claim 2 wherein a portion of the drive shaft extends through the housing; and
    the means for rotating the shaft comprises a wrench fitting on the portion of the drive shaft external to the housing.

6. A direct contact steam injection heater as recited in claim 5 wherein the wrench fitting includes a non-threaded nut mounted to the external portion of the drive shaft.

7. A direct contact steam injection heater as recited in claim 1 wherein the adjusting mechanism comprises:
    a drive shaft that extends through an opening in the sealed housing, the drive shaft having a threaded portion located at least in part within the sealed housing, a non-threaded sealing portion passing through the opening in the housing and an external portion having a wrench fitting located external of the sealed housing;
    a seal between the surface of the opening in the sealed housing and the non-threaded sealing portion of the drive shaft; and
    a follower engaging the threaded portion of the drive shaft and the combining tube stud so that the combining tube stud moves when the drive shaft rotates.

8. A direct contact steam injection heater as recited in claim 1 wherein:

the heater body has a mounting flange on an outside surface of the body around the stud opening, the mounting flange having a generally planar flange mounting surface;

the sealed housing has a generally planar mounting face corresponding to the flange mounting surface on the heater body, the planar mounting face on the housing having a seal groove; and the heater further comprises:

a seal located in the groove on the planar mounting face of the housing, the seal surrounding the combining tube stud opening to seal the interface between the planar mounting face on the housing and the flange mounting surface on the body.

9. A direct contact steam injection heater as recited in claim 1 wherein:

the adjusting mechanism includes a drive shaft having threads;

a follower engaging the threads on the drive shaft and engaging the combining tube stud so that the follower moves the combining tube stud when the drive shaft rotates; and a motor to rotate the drive shaft.

10. A direct contact steam injection heater as recited in claim 1 wherein the motor is an electric motor.

11. A direct contact steam injection heater as recited in claim 9 wherein:

the drive shaft extends through the sealed housing and an external portion of the drive shaft is located external to the sealed housing; and a drive shaft gear driven by the motor is attached to the external portion of the drive shaft.

12. A direct contact steam injection heater as recited in claim 11 wherein:

the motor has an output shaft;

a motor gear is mounted to the motor output shaft; and an idler gear engages the motor gear and the drive shaft gear.

13. A direct contact steam injection heater as recited in claim 1 wherein the adjusting mechanism comprises:

a sensor sensing a quality of the product that flows through the outlet of the heater, the sensor generating the feedback signal;

a controller that inputs the feedback signal and outputs a correction signal; and a motor that inputs the correction signal and drives the adjusting mechanism in accordance with the correction signal.

14. A direct contact steam injection heater as recited in claim 13 wherein the motor is an electric motor.

15. A direct contact steam injection heater as recited in claim 13 wherein the sensor is a pressure sensor.

16. A direct contact steam injection heater as recited in claim 15 further comprising a second pressure sensor located upstream of the heater to sense the pressure of the product flowing into the product inlet of the heater, the second pressure signal generating an upstream pressure signal that inputs the controller.

17. A direct contact steam injection heater as recited in claim 13 wherein the sensor is a viscosity sensor.

18. A direct contact steam injection heater as recited in claim 13 further comprising a displacement sensor that outputs a combining tube position signal that is transmitted to the controller.

19. A direct contact steam injection heater as recited in claim 18 wherein the displacement sensor is a revolution counter that counts revolutions of a drive shaft in the adjusting mechanism.

20. A direct contact steam injection heater as recited in claim 1 wherein the adjusting mechanism comprises:

a controller that outputs a correction signal; and a motor that inputs the correction signal and drives the adjusting mechanism in accordance with the correction signal.

21. A direct contact steam injection heater as recited in claim 20 wherein the controller cannot generate a correction signal to drive the motor beyond a maximum torque limit for the heater.

22. A direct contact steam injection heater as recited in claim 20 wherein the adjusting mechanism comprises:

a motor that inputs a correction signal and drives the adjusting mechanism in accordance with the correction signal; and a controller that generates the correction signal so that the combining tube will move at a rate no faster than about one-half an inch per minute when the combining tube is positioned within 25 percent of the total combining tube stroke from an optimum setting for the combining tube.

23. A direct contact steam injection heater as recited in claim 20 wherein the motor moves the combining tube at a constant rate for the total combining tube stroke.

24. A direct contact steam injection heater as recited in claim 1 wherein the adjusting mechanism comprises a drive shaft having threads and a follower engaging the threads on the drive shaft and engaging the combining tube stud so that the follower moves the combining tube stud when the drive shaft rotates; and the heater further comprises a revolution counter attached to a portion of the drive shaft external of the sealed housing.

* * * * *